(12) United States Patent
Wagoner (10) Patent No.: US 9,427,882 B1
(45) Date of Patent: Aug. 30, 2016

(54) POCKET SAFETY SAW (71) Applicant: Ronald Wagoner, Flagstaff, AZ (US)

(72) Inventor: Ronald Wagoner, Flagstaff, AZ (US)

(*) Notice: Subject to any disclaimer, the term of this patent is extended or adjusted under 35 U.S.C. 154(b) by 383 days.

(21) Appl. No.: 13/952,453

(22) Filed: Jul. 26, 2013

(51) Int. Cl.
*B23D 57/00* (2006.01)
*B26B 27/00* (2006.01)

(52) U.S. Cl.
CPC ........... *B26B 27/00* (2013.01); *B23D 57/0092* (2013.01); *B23D 57/0015* (2013.01)

(58) Field of Classification Search
CPC ............. B23D 61/18; B23D 57/0007; B23D 57/0015; B23D 57/0092; B26B 27/00
USPC .................. 30/155, 286, 291, 504, 505, 342
See application file for complete search history.

(56) References Cited

U.S. PATENT DOCUMENTS

| 210,421 | A | * | 12/1878 | Griffin | B23B 61/121 144/34.1 |
|---|---|---|---|---|---|
| 1,720,022 | A | * | 7/1929 | Vande Carr | B23D 49/12 30/504 |
| 1,778,996 | A | * | 10/1930 | Brackett | B23D 49/10 30/505 |
| 2,514,609 | A | * | 7/1950 | Roy | B23D 51/14 30/513 |
| 2,706,919 | A | * | 4/1955 | Roy | B23D 63/06 72/72 |
| 3,199,280 | A | | 8/1965 | Wilczek | |
| 3,205,575 | A | | 9/1965 | Senkewitz | |
| 3,756,298 | A | | 9/1973 | West | |
| 4,841,638 | A | * | 6/1989 | Bardeen | B23D 51/01 30/332 |
| 5,404,670 | A | | 4/1995 | Noll | |
| 6,497,046 | B1 | | 12/2002 | Bardeen et al. | |
| 2001/0035173 | A1 | | 11/2001 | Asada et al. | |
| 2002/0040626 | A1 | * | 4/2002 | Funakubo | B23D 51/01 76/112 |
| 2004/0200079 | A1 | | 10/2004 | Stoughton et al. | |
| 2005/0022635 | A1 | | 2/2005 | Ackeret et al. | |
| 2007/0151554 | A1 | * | 7/2007 | Song | B23D 61/18 125/15 |
| 2012/0066919 | A1 | * | 3/2012 | Holba | B27B 19/006 30/507 |

* cited by examiner

*Primary Examiner* — Kenneth E. Peterson
*Assistant Examiner* — Samuel A Davies
(74) *Attorney, Agent, or Firm* — Invention To Patent Services; Alex Hobson (57) ABSTRACT

A pocket safety saw that can be carried by a detention officer or psychiatric personnel without fear that it could do harm to another patient, inmate or guard is described. The pocket safety saw may be used to quickly cut down a suicidal patient or detainee from a hanging suicide attempt. An exemplary pocket saw comprises a handle, a saw portion, saw support, and safety saw element. A safety saw element is a saw element that will not cut human skin when pressed and reciprocated against the skin. The safety saw element may be used to cut fibrous material such as rope, cord, fabric and the like. A pocket safety saw may have one or more frangible features that cause the safety saw element to fracture when removed from the saw support. A frangible feature may be a removed portion of a safety saw element.

14 Claims, 7 Drawing Sheets

PRIOR ART

FIG. 10

PRIOR ART

FIG. 11

POCKET SAFETY SAW

BACKGROUND OF THE INVENTION

1. Field of the Invention

The present invention relates to a pocket safety saw.

2. Background

Personnel, including detention officers, prison guards and psychiatric personnel, for example, are sometimes faced with an emergency situation requiring them to quickly stop a suicide hanging attempt. Personnel must quickly cut the cord to save the patient's or detainee's life. Personnel are not allowed to carry sharp objects such as knives, as they may be used against them by a hostile patient or detainee. Therefore, when faced with this sort of emergency situation, personnel must quickly run to a secure location where a saw or knife may be retrieved. This time required to retrieve a cutting implement may be the difference between life and death of the patient or detainee.

In addition, kitchen workers at detention institutions or psychiatric facilities may also want to limit the use of sharp a potentially hazardous knives. The kitchen may require special access in lockdown protocols for tools, including knives.

Safety saws are available in a strand and are commonly used in backpacking and included in survival kits. These safety saws are configured to be wrapped around a tree limb and reciprocated back and forth to cut through the limb. Unfortunately, this type of strand may be used in a hostile environment to choke another patient or a guard.

There exists a need for a saw that can be safely carried in potentially hostile environments, such as a prison or psychiatric ward, and can effectively cut commonly used hanging devices. The saw would need to pose no threat to humans including cutting, stabbing or strangling.

SUMMARY OF THE INVENTION

The invention is directed to a pocket safety saw that can be carried by a detention officer or psychiatric personnel without fear that it could do harm to another patient, inmate or guard. In addition, a safety saw, as described herein, may be used for cutting vegetables, bread, and other appropriate consumables within the kitchens of detention institutions or psychiatric facilities. A safety saw for this purpose may be any suitable length, and may not be pocket-sized.

An exemplary pocket saw, as described herein, comprises a handle, a saw portion, saw support, and safety saw element. The saw portion comprises a safety saw element that extends along a portion of the length of the saw portion. The safety saw element is attached to the saw portion and has an exposed side and a retained side. The safety saw element may be any suitable safety saw type including, but not limited to, a spiral saw element, a saw element comprising of abrasive material, a recessed spiral saw element or any combination thereof. A recessed spiral saw element is much like a drill bit, having a recessed spiral cut along the surface of the length of the saw element. A safety saw element is defined as a saw element that will not cut human skin when pressed and reciprocated against the skin. A safety saw element may comprise a relatively sharp edge that is perpendicular to the length of the saw element and may spiral around a core. A safety saw element may comprise any suitable type of material including metal, plastic, epoxy, minerals, ceramics, composites, and any combination thereof. In an exemplary embodiment, a safety saw element consists essentially of metal and is configured as a spiral type safety saw element.

In one embodiment, a spiral safety saw element comprises a spiral saw element configured around a core that may be configured with any suitable distance between the spiral saw elements along the length including, but not limited to, about 0.1 inch or less, about 0.25 inch or less, about 0.5 inch or less and any suitable distance between and including the distances provided. In one embodiment, a safety saw element has a generally circular cross sectional geometry having any suitable outer diameter including, but not limited to, about 0.06 inch or more, about 0.125 inch or more, about 0.25 inch or more, about 0.375 inch or more, and any range between and including the diameters provided.

In an exemplary embodiment, a safety saw element comprises at least one frangible feature. A frangible feature is configured to ensure that the safety saw element cannot be removed from the saw support and used in a threatening way. In one embodiment, the frangible feature comprises a cut feature that extends across a portion of the safety saw element. A safety saw element may have any suitable number of frangible features including, but not limited to, one or more, two or more, three or more, five or more and the like. Likewise, frangible features may have any suitable distance between each other including, but not limited to, about 0.25 inch or more, about 0.5 inch or more, about 0.75 inch or more, about 1 inch or more, about 2 inches or more, about 3 inches or more in any range between and including the distances provided. A cut feature may extend more than halfway across the safety saw element or core of a spiral tooth type saw element, for example. In an exemplary embodiment, the frangible feature is a spiral cut spirals along a length of the safety saw element and in between spiral saw elements. A frangible feature may comprise a cut or removed saw element material that extends any suitable portion into or across the saw element or the core of the saw element including, but not limited to, about 10% of the depth or more, about 25% of the depth or more, about 50% of the depth or more, about 75% of the depth or more and any range between and including the percentages provided. The frangible feature increases the likelihood that the safety saw element will fracture if it is pulled from the saw support. If a detainee attempts to remove the safety saw element, they will obtain a plurality of pieces or a substantially weakened length of safety saw element.

The frangible feature may be configured in any suitable location along a safety saw element. For example, a cut feature may extend from the exposed side or the retained side of the safety saw element.

The pocket safety saw further comprises a blunt tip, in some embodiments. A blunt tip may be configured to eliminate the potential that the safety saw could be used for stabbing. The tip of the pocket safety saw may be rounded and may have a cross-sectional area that is greater than the cross-sectional area of the saw support along the safety saw element portion. In addition, the safety saw element may not extend to the tip of the saw support. The tip may extend over the end of the safety saw element.

The saw support may be configured with a backside that is wider than the saw side. This configuration may further reduce potential cutting threats. The saw support may be made out of any suitable material including, but not limited to, metal, plastic, epoxy, rubber, elastomer, composite materials, and any combination of suitable materials. In an exemplary embodiment, the saw support and/or the saw handle consist essentially of a rubber or elastomer. Rubber and elastomeric materials have very high coefficients of friction and would prevent the safety saw from being used to saw through any rigid materials.

A saw support may retain a safety saw element on a first and second end and have a gap or space between the safety saw element and saw support along a portion of the length of the saw element.

A safety saw element may be retained on or partially within the saw support through any suitable means including, but not limited to, adhesive, welding, fasteners, staples, pins and the like. In an exemplary embodiment, a safety saw element is adhered within a slot configured along a length of the saw support.

In some embodiments, the pocket safety saw is configured as a folding saw. A folding saw configuration comprises a saw portion that is configured to fold toward the handle portion whereby the saw portion is substantially parallel with the handle. In an exemplary embodiment, the saw portion is configured to fold and be at least partially retained within the handle. The pocket safety saw, as described herein, may have any suitable length including, but not limited to, about 3 inches or more, about 4 inches or more, about 6 inches or more, about 8 inches or more, about 10 inches or more, and any range between and including the length values provided. A safety saw, as described herein, may be configured with a longer length, and a longer saw element for kitchen applications. For kitchen applications, a safety saw, as described herein, may be 10 inches or more, or 12 inches or more.

The pocket safety saw, as described herein, may consist essentially of a one-piece body and a safety saw element attached thereto. The body, consisting of the handle and saw support, may be a one-piece element that is molded, including injection molding. The safety saw element may be added after molding, or may be over-molded to be secured in place during the molding process.

The summary of the invention is provided as a general introduction to some of the embodiments of the invention, and is not intended to be limiting. Additional example embodiments, including variations and alternative configurations of the invention, are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 10:
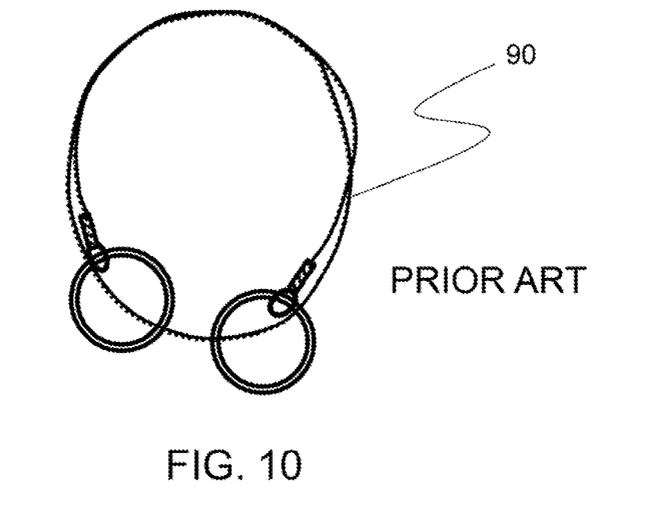
FIG. 10 shows a top-down view of a spiral toothed camping saw.

As shown in FIG. 10, a survival or camping saw 90 is typically configured as a loose strand having a loop on either end. As described herein, this type of saw element could be used as a strangling device and would be dangerous to carry in detention or psychiatric facilities, for example.

Figure 11:
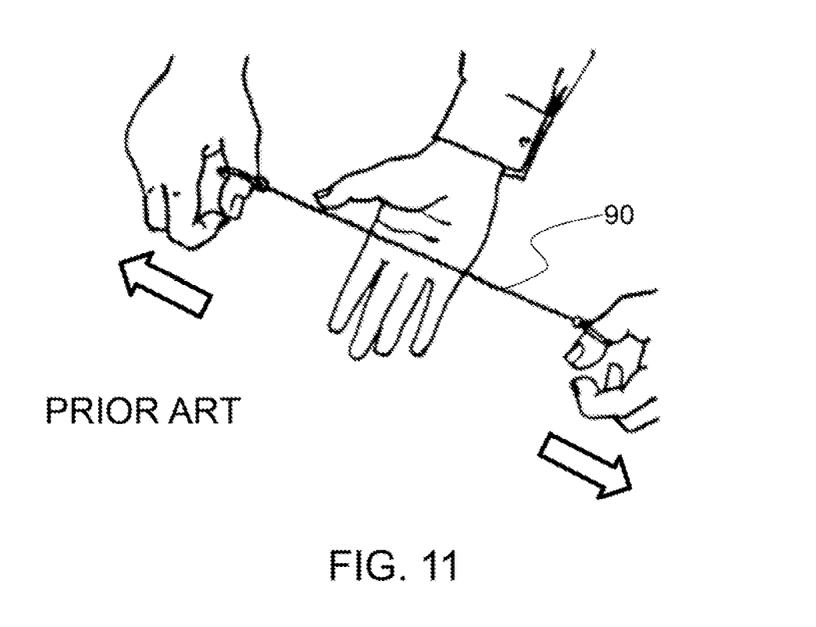
FIG. 11 shows a perspective view of a spiral toothed camping saw being reciprocated over the palm of a person's hand.

As shown in FIG. 11, a spiral toothed camping saw 90 is being reciprocated back and forth over a person's palm. These type of spiral toothed saws will not cut into a person's skin.

Figure 1:
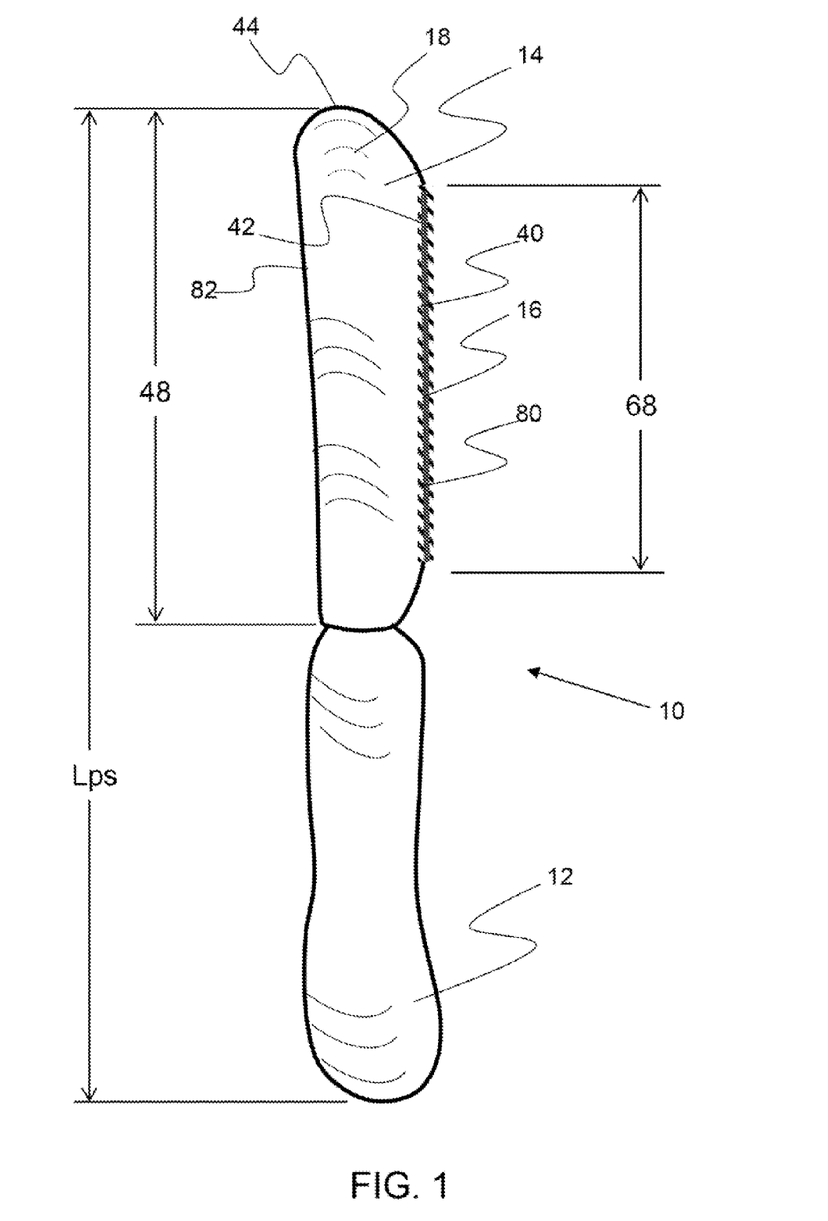
FIG. 1 shows a side view of an exemplary pocket safety saw having a safety saw element along a portion of the length of the saw support, as described herein.

As shown in FIG. 1, an exemplary pocket safety saw 10 has a safety saw element 16 retained along a portion of the length of the saw support 18. The safety saw element does not extend to the tip 44 of the pocket safety saw. The saw element length 68 is less than the length 48 of the saw portion 14. The retained side 42 of the saw element is retained by the saw support along essentially the entire saw element length 68, whereby there is effectively no gap between the saw element and the saw support. The overall length of the pocket safety saw Lps is also shown in FIG. 1.

The length of the saw portion 48 may be any suitable portion of the overall length of the pocket safety saw Lps. The safety saw element 16, may extend any suitable portion of the length of the saw portion 14 including, but not limited to, about 50% or more, about 75% or more, about 90% or more, substantially the entire length and any range between and including the length portions provided.

Figures 2A, 2B, 2C:
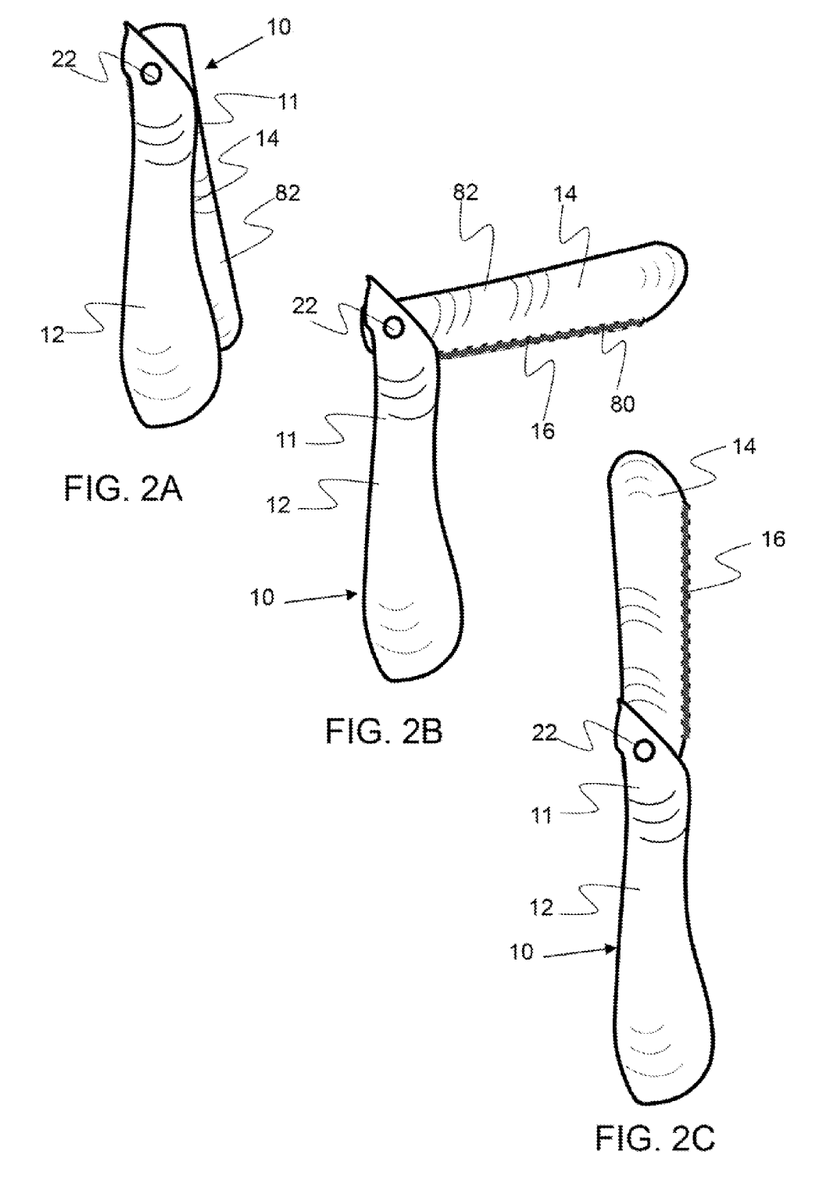
FIGS. 2A-2C show an exemplary folding pocket safety saw in various orientations.

As shown in FIGS. 2A-2C, an exemplary folding pocket safety saw 11 is configured such that the saw portion 14 folds toward the handle portion 12. A pivot 22 allows the saw portion to pivot down to a substantially parallel orientation with the handle, as shown in FIG. 2A. The saw portion shown in FIG. 2A is partially retained within the handle 12. The folding pocket safety saw 11 shown in FIG. 2B is in an intermediate position between, closed in FIG. 2A and open in FIG. 2C. The folding pocket safety saw shown in FIG. 2C is in an open orientation or position.

Figure 3:
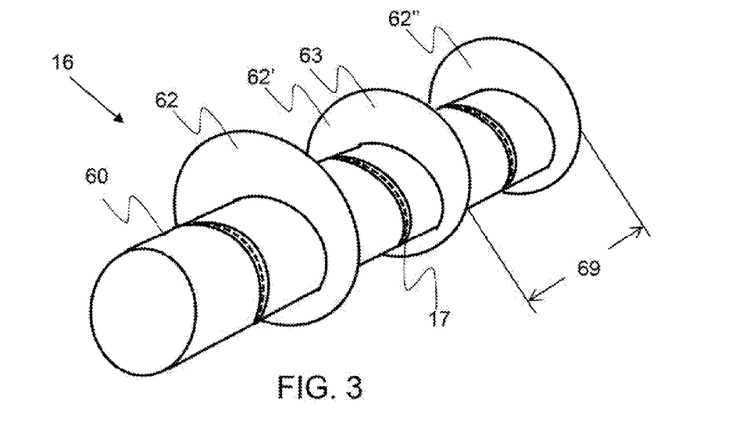
FIG. 3 shows a perspective view of an exemplary spiral type safety saw element.

As shown in FIG. 3, an exemplary spiral type 63 safety saw element 16 comprises a core 60 and spiral saw element 62. A spiral type frangible feature 70 is shown as a cut along the spiral type safety saw element 63. The spiral type frangible feature may extend any suitable depth into the core 60. If the spiral type safety saw element were to be removed from the pocket safety saw, the spiral type frangible feature would cause the safety saw element to either break upon retrieval from the safety saw or have very limited strength. The distance between the spiral saw elements 62' and 62" is shown as the distance 69.

Figure 4:
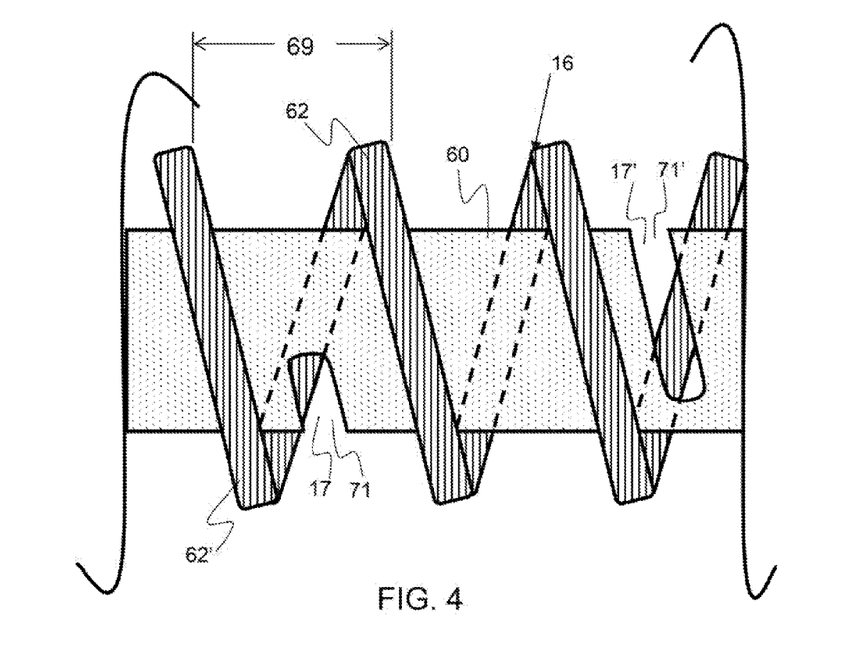
FIG. 4 shows a side view of an exemplary safety saw element having a plurality of frangible features.

As shown in FIG. 4, an exemplary safety saw element 16 has a plurality of frangible features 17 that extend through a portion of the core 60. The cut feature 71 extends from a first side of the safety saw element and the cut feature 71' extends from a second side of the safety saw element. The cut feature 71 extends about 25% of the depth through core of the safety saw element, whereas cut element 71' extends more than about 75% of the depth through core of the safety saw element. The distance between the spiral saw elements 62' and 62 is shown as the distance 69.

Figure 5:
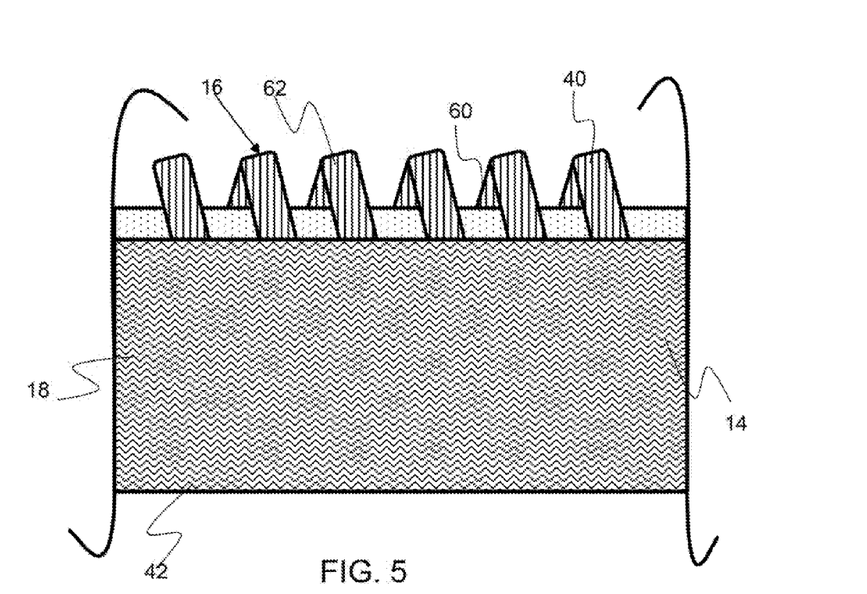
FIG. 5 shows a side view of an exemplary saw portion having a retained safety saw element.

As shown in FIG. 5, an exemplary saw portion 14 has a saw support 18 with a retained safety saw element 16. A portion of the safety saw element 16 is embedded within the saw support. Any suitable means to retain a safety saw element to the saw support may be used including, but not limited to, adhesive, interference fit geometries, fasteners such as staples or pins, for example, and the like. The safety saw element 16 has an exposed side 40 and a retained side (not shown).

Figure 6:
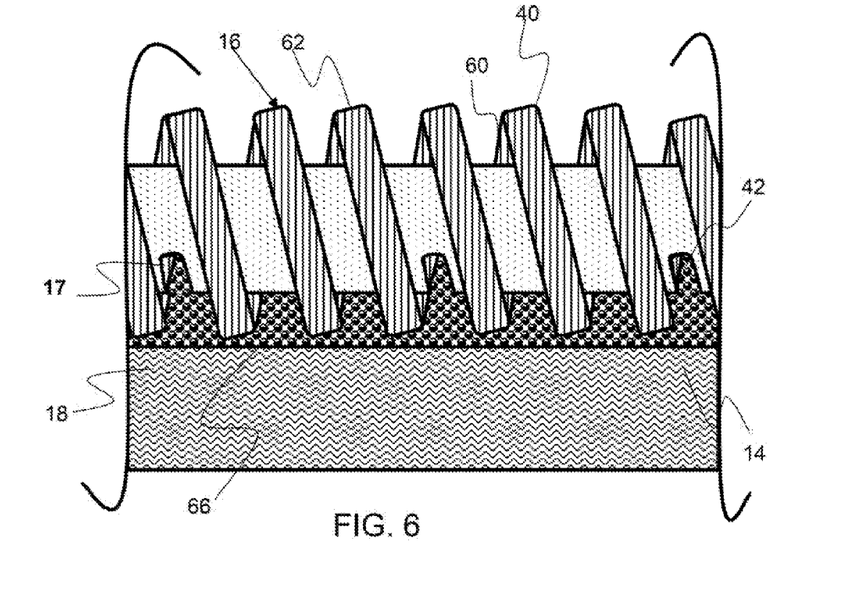
FIG. 6 shows a cross-sectional side view of an exemplary saw portion having a retained safety saw element with a plurality of frangible features.
Figure 7:
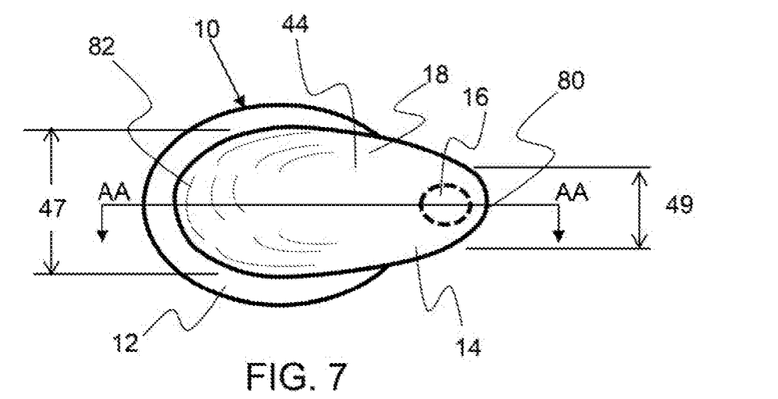
FIG. 7 shows a top-down view of an exemplary pocket safety saw having a blunt tip that extends over the safety saw element.

FIG. 6 shows a cross-sectional side view of an exemplary saw portion 18 as taken along line AA in FIG. 7. This cross-sectional view shows one embodiment of a retained safety saw element 16 within a saw support 18. An adhesive 66 is configured along the retained side 42 of the safety saw element and retains the safety saw element to the saw support 18. A groove or slot may be configured within the saw support for accepting a safety saw element and adhesive. A plurality of frangible features 17 are shown extending from the retained side 42 of the safety saw element. The safety saw element 16 comprises a spiral saw element 62 that effectively abrades through fibrous material such as rope, cord, cloth, wood and the like. Note that the sharp edges are not exposed and/or are configured so close to each other that they will not cut human skin.

As shown in FIG. 7, an exemplary pocket safety saw 10 has a blunt tip 44 that extends over the safety saw element 16. The blunt tip 44 is rounded such that it could not be used as a stabbing weapon. In addition, the backside 82 of the saw support is wider, having a width 47, than the saw side 80 width 49.

Figure 8:
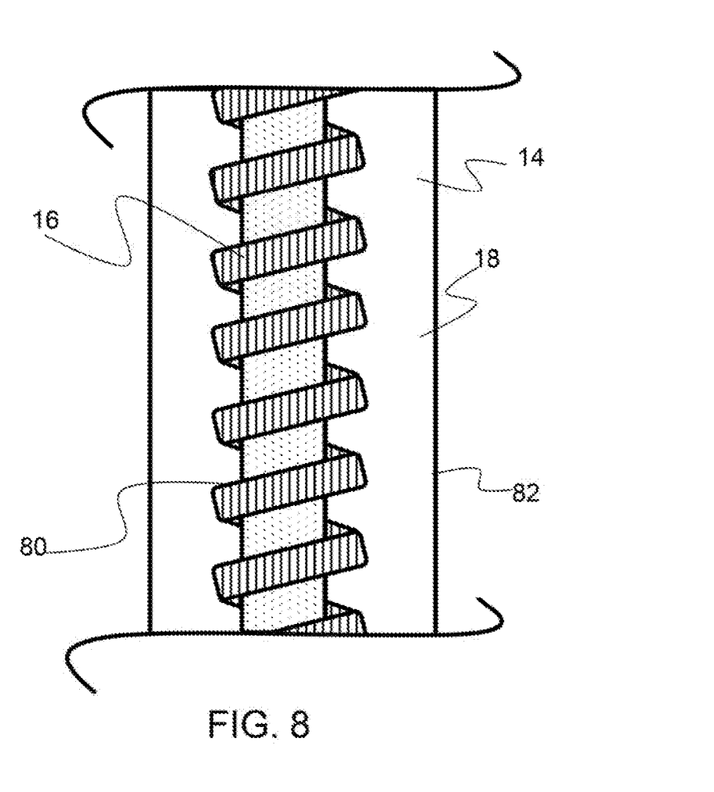
FIG. 8 shows a front view of an exemplary saw portion having a safety saw element retained thereon and a backside that is wider than a saw side.

As shown in FIG. 8, an exemplary saw portion 14 has a safety saw element 16 retained thereon and a backside 82 that is wider than the saw side 80. This configuration may further prevent the use of the pocket safety saw as a weapon.

Figure 9:
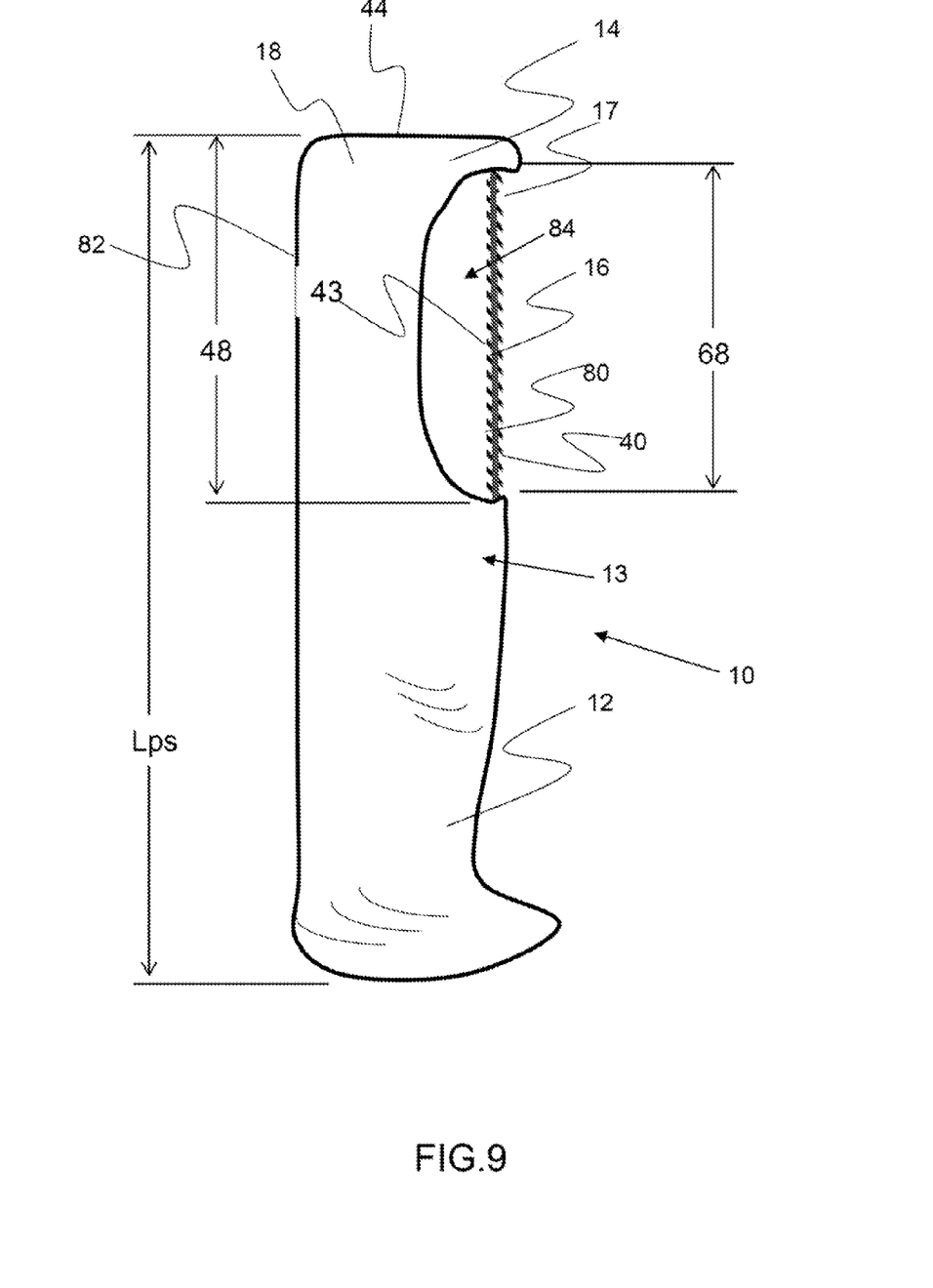
FIG. 9 shows a side view of an exemplary pocket safety saw having a safety saw element retained at a first end and a second end, and a one-piece saw body, as described herein.

As shown in FIG. 9, an exemplary pocket safety saw 10 has a first end and a second end of a safety saw element 16 retained in a one-piece saw body 13. There is a gap 84 between the back-side 43 of the saw element 16 and the saw support 18. In this embodiment, the saw element 16 does not have a retained side as shown in FIG. 1, rather the saw element is retained at the ends. The saw element 16 extends along a portion of the length of the saw support portion 18 of the saw body 13. Any number of frangible features 17 may be configured along the length of the saw element. Note that the tip 44 extends over the saw element 16. This pocket safety saw may be made by molding the saw body as a one-piece unit wherein the first and second ends of the saw element are retained during the molding process. The saw body may be a plastic or elastomeric material that is molded in a one-piece unit.

EXAMPLE 1

A spiral toothed hacksaw blade, available from Durafix, Taylors S.C., was cut to approximately 2.5 inches and attached to a one-piece safety saw body as generally shown in FIG. 9. The one-piece safety saw body 13 was made out of a piece of wood. Two small holes were drilled in the safety saw body for insertion of the first and second ends of the saw element 16. A small cut type frangible feature 17 was made in the saw element toward the tip end as indicated in FIG. 9. The frangible feature would cause the saw element to break if it were attempted to be removed.

EXAMPLE 2

Prophetic

A spiral toothed coping saw blade, available from Durafix Inc., Taylors S.C., is cut to approximately 2⅝ inches and attached to a one-piece safety saw body as generally shown in FIG. 1. The spiral toothed coping saw blade is cut in a plurality of places to create frangible features. The backside of the saw element is attached to the saw support portion by molding. A melted plastic material is poured into a mold and a saw element is pressed into the melted plastic. The melted plastic then hardens to retain the saw element to the safety saw body.

DEFINITIONS

Safety saw element, as used herein, is defined as a saw element that will not cut human skin when pressed against it and reciprocated back and forth. In some embodiments a safety saw element comprises no exposed sharp edges and is safe for human contact in that it cannot be used to cut, stab or strangle a human.

Spiral saw element, as used herein, comprises a saw element that spirals around a core and may have any suitable distance between discrete saw elements along the length. A small gap between saw elements may effectively prevent the cutting of human skin when pressed and reciprocated. An example of a spiral saw element is a spiral toothed saw available from Durafix Inc, Taylors, S.C., for example. A spiral saw element also includes a recessed cut in a spiral geometry and can be generally described by a drill bit, for example.

A frangible feature, as used herein, is defined as a removed portion of a safety saw element that is configured to effectively weaken the safety saw element such that it fractures when it is removed from a saw support, or is significantly weakened such that it cannot be used as a saw when removed from the saw support.

The term safety saw element and saw element are used interchangeably throughout the specification.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A pocket safety saw comprising:
    a) a handle portion;
    b) a saw portion, having a length, comprising:
        i) a saw support comprising:
            a saw side; and
            a back side;
        ii) a safety saw element attached to and extending along a portion of said length of said saw portion, said safety saw element comprising:
            a core element;
            a spiral saw element that extends from and spirals around said core element;
            at least one frangible feature, whereby said safety saw element will fracture if removed from said saw support;
            an exposed side; and
            a retained side;
        wherein said saw portion has a width between said saw side and said back side that is wider than a width of said safety saw element; and
        wherein said retained side of said safety saw element is retained by said saw support along essentially an entire length of said safety saw element, and wherein said pocket saw has a length of no more than 8 inches thereby enabling said pocket safety saw to fit within a pants pocket.

2. The pocket safety saw of claim 1, wherein the safety saw element comprises an abrasive material.

3. The pocket safety saw of claim 1, wherein the pocket safety saw comprises a tip that is blunt and wherein the safety saw element does not extend to said tip.

4. The pocket safety saw of claim 1, wherein the handle portion and saw support are a one-piece unit.

5. The pocket safety saw of claim 1, wherein the at least one frangible feature comprises a cut that extends across a portion of the safety saw element.

6. The pocket safety saw of claim 5, wherein the cut is configured on the retained side of the safety saw element.

7. The pocket safety saw of claim 5, wherein the cut is a spiral cut.

8. The pocket safety saw of claim 1, comprising a pivot joining the saw portion to the handle portion, wherein the saw portion is configured to fold toward the handle portion about said pivot.

9. The pocket safety saw of claim 1, wherein the safety saw element comprises essentially no exposed sharp edges, whereby the pocket safety saw is safe for human contact.

10. A pocket safety saw comprising:
    a) a handle portion;
    b) a saw portion, having a length, comprising:
        i) a saw support comprising
            a saw side; and
            a back side;
        ii) a safety saw element attached to and extending along a portion of said length of said saw portion, said safety saw element comprising:
            a core element;
            a spiral saw element that extends from and spirals around said core element;
            at least one frangible feature, whereby said safety saw element will fracture if removed from said saw support;
            an exposed side; and
            a retained side;
        wherein the saw portion has a width between said saw side and said back side that is wider than a width of said safety saw element;
        wherein said retained side of said safety saw element is retained by said saw support and wherein said pocket safety saw has a length of no more than 8 inches, thereby enabling said pocket safety saw to fit within a pants pocket;
        wherein the safety saw element comprises essentially no exposed sharp edges, whereby the pocket safety saw is safe for human contact; and
        wherein the pocket safety saw comprises a tip that is blunt and wherein the safety saw element does not extend to said tip.

11. The pocket safety saw of claim 10, wherein the at least one frangible feature comprises a cut that extends across a portion of the safety saw element.

12. The pocket safety saw of claim 11, wherein the cut is configured on the retained side of the safety saw element.

13. The pocket safety saw of claim 10, wherein the safety saw element
    comprises an abrasive material.

14. The safety saw of claim 10, wherein the safety saw element is a spiral toothed type saw element.

* * * * *